United States Patent Office 3,769,410
Patented Oct. 30, 1973

3,769,410
TERTIARY AMINES WITH ANTALGIC AND ANTI-INFLAMMATORY ACTIVITY
Francois Robert Bertrand, 9 Rue Voillier,
1200 Geneva, Switzerland
No Drawing. Continuation-in-part of abandoned application Ser. No. 889,723, Dec. 31, 1969. This application June 7, 1972, Ser. No. 260,527
Claims priority, application France, Dec. 31, 1969, 182,572
Int. Cl. A61k 27/00
U.S. Cl. 424—258                                9 Claims

ABSTRACT OF THE DISCLOSURE

Useful medicament, particularly as an anti-inflammatory and antalgic agent, based on tertiary amine derivatives, characterized by the fact that the tertiary amine derivatives comply to the general formula:

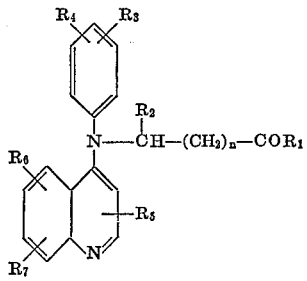

in which:

$R_1$ is an OH, alkoxy radical of preference methoxy, ethoxy, $O(CH_2)_2$—$N(CH_3)_2$, $OCH_2$—$C_6H_4$-propoxy, cyclic or heterocyclic aryloxy, O-mono (or poly) hydroxyalkyl (of preference glycerine), single amino (particularly $NHCH_3$), $N(CH_3)_2$, $NH$—$(CH_2)_2OH$, $NH$—$(CH_2)_2N(CH_3)_2$, morpholine), all groups being able to be substituted, being substituted or not;

$n$ is an integer being able to take all values from 0 to 4;

$R_2$ is the hydrogen, an alkyl (particularly methyl) radical, hydroxy, acid or ester (particularly COOH or $COOC_2H_5$), alkylaryl (particularly) benzyl), cyclic or heterocyclic alkyl acid or alkyl ester, or amino, all groups capable of being substituted, being substituted or not;

$R_3$ and $R_4$ are the identical or different radicals, chosen from among the following radicals: OH, hydrogen, halogen, alkyl, cyclic or heterocyclic aryloxy, cyclic or heterocyclic alkoxyaryl, nitro, simple or substituted amino, acid or ester, all groups capable of being substituted amino, acid or ester, all groups capable of being substituted, being substituted or not;

$R_5$ is the hydrogen, a halogen, an alkyl group, cyclic or heterocyclic aryl, acid or ester, CN, nitro, amino, simple or substituted carbamido ($CONH_2$), all groups being capable of being substituted, being substituted or not;

$R_6$ and $R_7$ are the identical or different radicals chosen from among the following groupings: H, alkyl, cyclic or heterocyclic aryl, cyclic or heterocyclic alkylaryl, halogen, nitro, simple or substituted amino, acid or ester, OH, alkoxy, aryloxy, cyclic or heterocyclic aryloxy, cyclic or heterocyclic O-alkylaryl.

This is a continuation-in-part of my earlier application Ser. No. 889,723 filed on Dec. 31, 1969 now abandoned.

The present invention relates to new tertiary amines possessing interesting antalgic and anti-inflammatory properties and complying with the general formula:

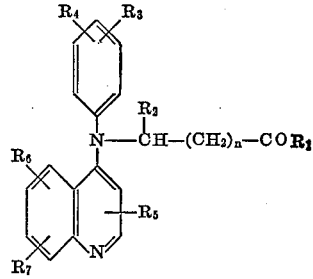

in which:
$R_1$ is an OH, alkoxy (of preference methoxy, ethoxy, $O(CH_2)_2$—$N(CH_3)_2$, $OCH_2$—$C_6H_4$-propoxy), cyclic or heterocyclic aryloxy, O-mono (or poly-) hydroxyalkyl (of preference glycerine), elementary amino (particularly $NHCH_3$), $N(CH_3)_2$, $NH$—$(CH_2)_2OH$, $NH$—$(CH_2)_2$—$N(CH_3)_2$, morpholino), all the groups capable of being substituted, being substituted or not;

$n$ is an integer able to take all the values from 0 to 4, but, of preference, equal to 1 or 2;

$R_2$ is the hydrogen, an alkyl radical (particularly methyl), hydroxy, radical acid or ester (particularly COOH or $COOC_2H_5$), (particularly benzyl) cyclic or heterocyclic alkylaryl, alkyl acid or alkyl ester, or amino, all the groups capable or being substituted, being substiuted or not;

$R_3$ and $R_4$ are identical or different radicals, chosen among the following radicals: OH, hydrogen, halogen, alkyl, cyclic or heterocyclic aryl, alkyl, alkoxy, cyclic or heterocyclic alkoxyaryl, nitro, primary or substituted amino, acid or ester, all groups capable of being substituted, being suubstituted or not;

$R_5$ is hydrogen, a halogen, an alkyl group, cyclic or heterocyclic aryl, acid or ester, CN, nitro, amino, primary or substituted ($CONH_2$), all groups being substituted, being substituted or not;

$R_6$ and $R_7$ are identical or different radicals chosen from among the following groupings: H, alkyl, cyclic or heterocyclic aryl, cyclic or heterocyclic alkylaryl, halogen, nitro, primary or substituted amino, acid or ester, OH, alkoxy, cyclic or heterocyclic aryloxy, O-cyclic or heterocyclic alkylaryl.

In a general way, the compounds according to the invention are obtained by means of one of the four following preparation processes:

PROCESS A (1) Reaction of a substituted aniline with a quinoline according to the following diagram:

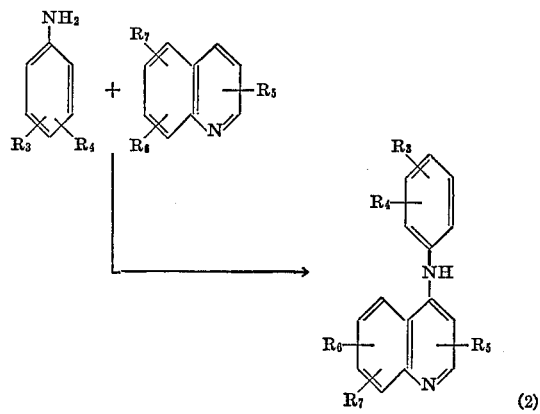

(2)

(2) N-alkylation of (2) according to one of the following diagrams:

(a)     (2) + Hal—CHR₂—COR₁ → (1)

(b)     (2) + Hal—CH—(COR₁)₂ + decarboxylption → (1)

(c)     (2) + (CH₂OH—NaSO₃ + KCN) → acetonitrile $\xrightarrow[\text{NaOH}]{\text{HCL} \\ \text{H}_2\text{O}}$ (1)

The acid, ester or amide, thus obtained is next converted by known processes into salt, amide or ester by the reactions of saponification, esterification, amination, well-known to the professional.

PROCESS B

Reaction of a substituted N-alkyl aniline with a quinoline, also substituted according to the following diagram:

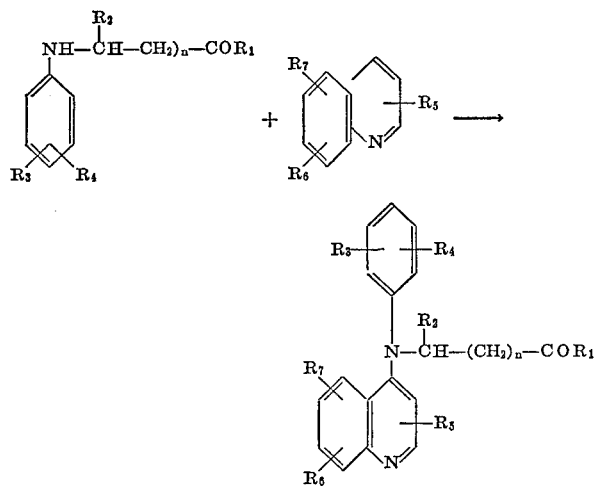

PROCESS C

Reaction of an N-alkyl amino quinoline with a substituted benzene group according to the following diagram:

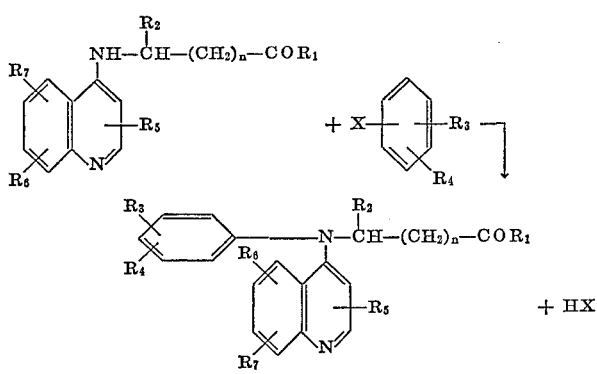

In this case X can be R₃ or R₄.

PROCESS D

Reaction of an N-arylglycine substituted with a di-acid capable of being fixed to the nitrogen of the N-glycine then by action of an orthoformate and of an aniline, to give an acrylamide which is cycled.

EXPERIMENTAL PART

Example 1 (Process A)

(a) 4-(4'-methoxyphenyl)-amino - 7 - chloroquinoline chlorhydrate: 50 g. of 4,7-dichloroquinoline are dissolved in a mixture of 400 g. of water and 100 g. of hydrochloric acid, concentrated 25% at 50°. At the same temperature a solution of 31 g. of p-anisidine in a mixture of 300 ml. of water and 46 g. of 25% concentrated hdyrochloric acid is added. It is then agitated for 3 hours at 60°, then again for 4 hours at 95°. The chlorhydrate of 4-(4'-methoxyphenyl)-amino-7 - chloroquinoline quickly precipitates. After filtration, washing then drying in a vacuum at 70°, 69.3 g. of the yellow product having a fusion point 290°–292° is obtained.

(b) N-(7-chloroquinoline-4-yl)-N-(4'-methoxyphenyl)-glycine (MG 3000): 50 g. of chlorhydrate of 4-(4'-methoxyphenyl)-amino-7-chloroquinoline are treated in 600 ml. of dry xylene with 35 g. of triethylamine. It is brought to reflux under agitation. Then 31.2 g. of ethyl bromoacetate is slowly added for ½ hour under agitation, then is kept at reflux for another 1½ hour. The N-(7-chloroquinoline-4-yl)-N - (4' - methoxyphenyl)-glycine ethyl ester quickly crystallizes. After cooling the precipitate is filtered and dried in a vacuum. It is mixed in water to eliminate the halohydrates of triethylamine, then dried.

Thus 52 g. of raw ester still containing 11% of non-transformed base is obtained. The ester recrystallized in toluene gives a fusion point of 199° to 201°. The former is saponified to reflux for ¼ hour in a melange of 250 ml. of caustic potash to 4% with the addition of 25 ml. of ethyl alcohol. The solution obtained is filtered cold then acidified to pH 5.5 by means of 25% of concentrated hydrochloric acid. Thus 45.2 g. of N-(7-chloroquinoline-4-yl)-N-(4'-methoxyphenyl)-glycine are made to precipitate. F=212–213°. The product is recrystallized in a mixture of 1200 ml. of ethyl alcohol and 3400 ml. of water, to reflux. After cooling, 35 g. of the product precipitates in the form of fine yellow needles: fusion=225–227°.

| Calculated: | Found |
|---|---|
| C, 57.07% | 57.68% |
| H, 5.06% | 55.17% |
| N, 7.40% | 7.42% |

Example 2 (Process A)

(a) 4 - (4' - ethoxyphenyl)-amino - 7 - chloroquinoline chlorhydrate: 50 g. of 4,7-dichloroquinoline is dissolved in a mixture of 400 g. of water and 100 g. of 25% concentrated hydrochloric acid at 50°. At the same temperature a solution of 34.3 g. of p-phenetidine in a mixture of 300 ml. of water and 46 g. of 25% concentrated hydrochloric acid is added. It is agitated for 3 hours at 60° and then for 4 hours at 95°. The chlorhydrate of 4-(4'-ethoxyphenyl-amino-7-chloroquinoline quickly precipitates. After filtration, washing, and drying in a vacuum at 70°, 75.5 g. of a yellow product having a fusion point of 315° to 316°, is obtained.

(b) 83.8 g. of chlorhydrate of 4-(4'-ethoxyphenyl)-amino-7-chloroquinoline is treated in 600 ml. of dry xylene with 56 g. of triethylamine. It is brought to reflux with agitation. Then 50.2 g. of ethyl bromoacetate is slowly added over ½ hour. The N-(7-chloroquinoline-4-yl)-N-(4'-ethoxyphenyl)-glycine ethyl ester crystallizes rapidly. After diluting with water to eliminate the halohydrates of triethylamine, it is dried in a vacuum at 70°. Thus 93 g. of raw ester is obtained. Fusion point after recrystallization: 215° to 216°. The raw ester previously obtained is saponified to reflux in 35 ml. of 4% caustic potash added to 35 ml. of ethyl alcohol. The solution obtained is cold filtered then acidified to pH 5.5 with 25% concentrated hydrochloric acid. Thus 75 g. of N-(7-chloroquinoline-4-yl)-N-(4'-ethoxyphenyl)-glycine is made to precipitate: fusion=228–230°. The product is purified by being put in a solution of 4% caustic potash then is precipitated with concentrated HCl. The product crystallizes in fine yellow needles. F=232°–234°.

Example 3 (Process A)

The chlorhydrate of 4-(4'-methoxyphenyl)-amino-7-chloroquinoline is prepared as in part (a) of Example 1, then treated with diethyl bromomalonate. The N-(7-chloroquinoline - 4-yl)-N-(4'-methoxypheny)-amino-malonate of diethyl obtained is saponified and decarboxylized by treating with soda and then with hydrochloric acid. The synthesis is carried out according to the following diagram:

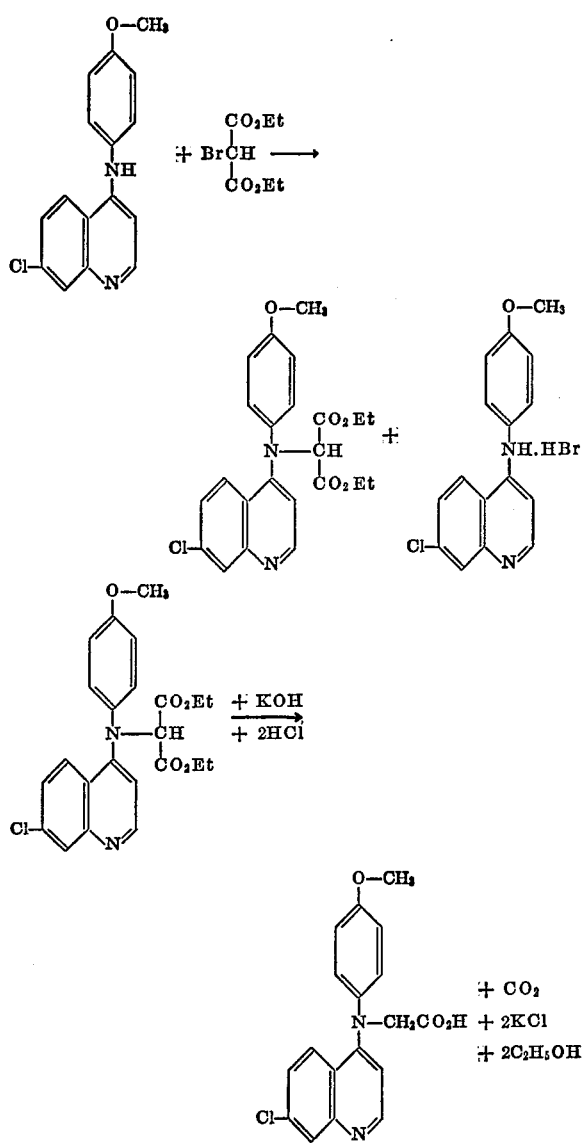

Mode of operation: In a mixture of 57 g. of 4-(4'-methoxyphenyl)-amino-7-chloroquinoline and 250 ml. of toluene, 26.3 g. of diethyl bromomalonate is slowly introduced under agitation at 75° to 80° then brought to reflux for 6 hours. The solution is filtered while still warm and 40 g. of N-(7-chloroquinoline-4-yl)-N-(4'-methoxyphenyl)-amino-malonate ethyl ester is made to crystallize.

40 g. of N-(7-chloroquinoline-4-yl)-N-(4'-methoxyphenyl)-amino-malonate ethyl ester is saponified for ½ hour to reflux in 500 ml. of an aqueous solution of 5% caustic potash added to 100 ml. of ethanol. This is filtered under heat then 250 ml. of water is added. With concentrated hydrochloric acid this is neutralized and acidified to pH 1. It is again brought to reflux under agitation for an hour for decarboxylation, then 29 g. of N-(7-chloroquinoline-4-yl)-N-(4'-methoxyphenyl)-glycine is made to precipitate after neutralization to pH 5: fusion point=218 to 220°.

Example 4 (Process A)

From the ethyl ester obtained as in Example 1, the amide can be prepared according to the following diagram:

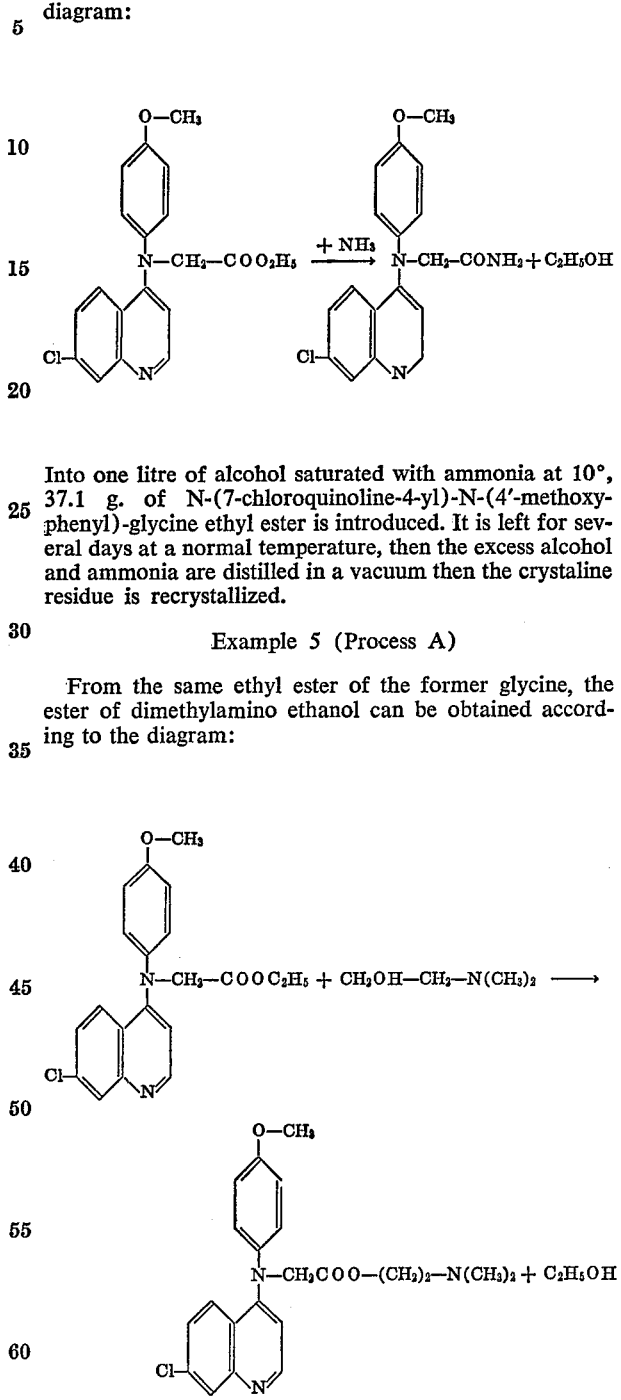

Into one litre of alcohol saturated with ammonia at 10°, 37.1 g. of N-(7-chloroquinoline-4-yl)-N-(4'-methoxyphenyl)-glycine ethyl ester is introduced. It is left for several days at a normal temperature, then the excess alcohol and ammonia are distilled in a vacuum then the crystaline residue is recrystallized.

Example 5 (Process A)

From the same ethyl ester of the former glycine, the ester of dimethylamino ethanol can be obtained according to the diagram:

The mode of operation is as follows: 5 g. of sodium is dissolved in 300 ml. of dimethylamino ethanol. Then 37.1 g. of N-(7-chloroquinoline - 4 - yl)-N-(4'-methoxyphenyl)-glycine ethyl ester are introduced into the reaction. The mixture is heated at 80° to 90°, then the ethanol formed by transesterification is slowly distilled. Then the excess amino alcohol is distilled in a vacuum and the residue is extracted with normal hydrochloric acid. After neutraliztion of the said acid extract, the ester of the dimethylamino ethanol is left to crystallize.

Example 6 (Process A)

Preparation of a glycerol ester from the glycine. The reaction is the following:

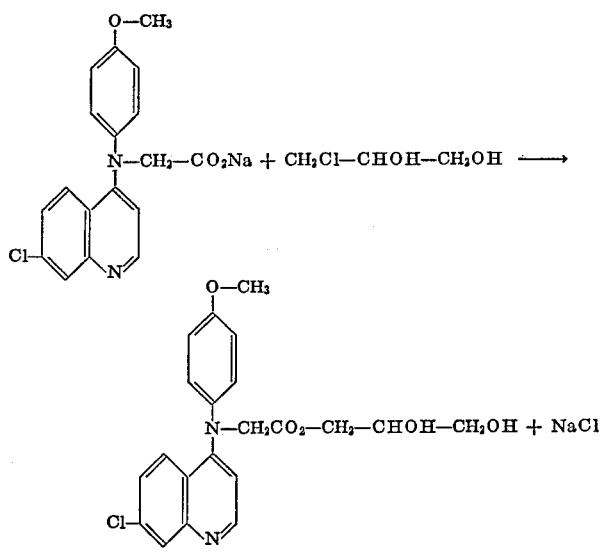

Mode of operation: In the methanol, 36.5 g. of salt of sodium of N-(7-chloroquinoline-4-yl) - N - (4'-methoxyphenyl)glycine and 15 g. of α-monochloroglycerine are brought to boiling to reflux for two hours. This all forms a solution; then after ½ hour of reaction a precipitate appears. It is all left to crystallize; then the glycerinic ester is purified by precipitation in an acid medium.

Example 7 (Process A)

By a process similar to that described in Example 1 but by replacing the ethyl bromoacetate by the α-bromopropionate or the β-bromopropionate of ethyl, is obtained:

The N-(7-chloroquinoline-4-yl) - N - (4'-methoxyphenyl)-α-amino propionic acid, of the formula:

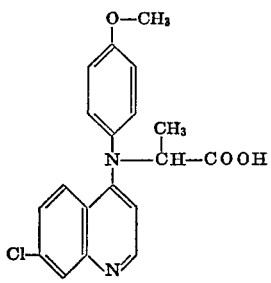

or N - (7-chloroquinoline-4-yl)-N-(4'-methoxyphenyl)-β-amino propionic acid of the formula:

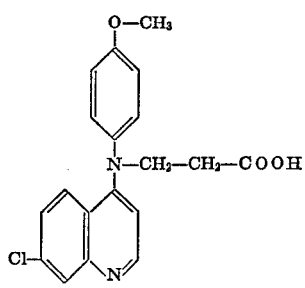

By the reaction well-known to the professional, the nature of the substituents fixed on the phenyl nucleus can also be altered.

Example 8 (Process A)

For example, the methoxy radical can be transformed into hydroxy radical by the action of the hydriodic acid according to the reaction:

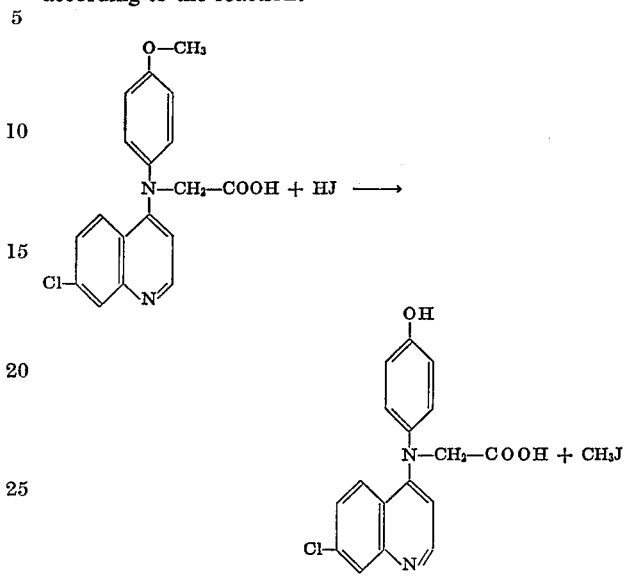

Mode of operation: 34.2 g. N-(7-chloroquinoline-4-yl)-N-(4'-methoxyphenyl)-glycine is treated with 250 ml. of 57% concentrated hydriodic acid to reflux for 6–8 hours. By means of a column, the methyl iodide so formed is continuously distilled. After cooling the excess hydriodic acid is distilled in a vacuum. The crystallized residue is put back into boiling water, next brought to pH 5.5 to 6, then recrystallized.

Example 9 (Process A)

The N-(7-chloroquinoline-4-yl)-N-(3'-hydroxy-4'-carboxy-phenyl)-glycine can be obtained according to the following diagram:

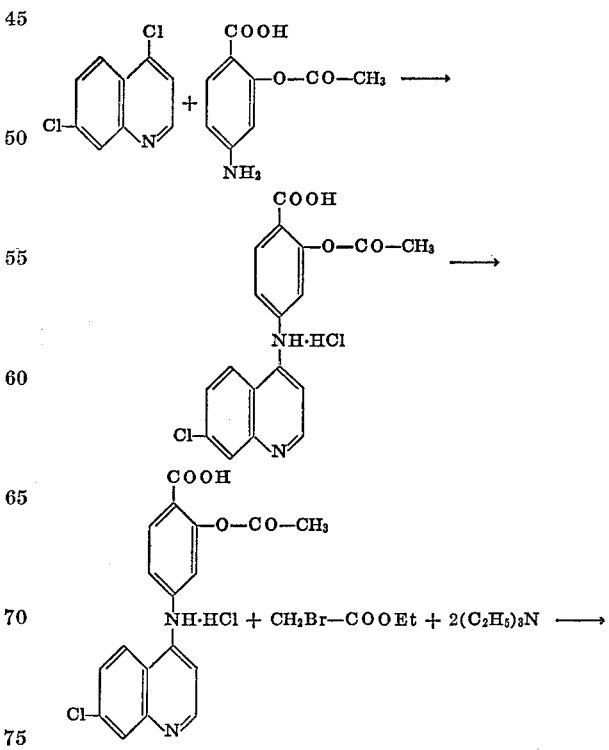

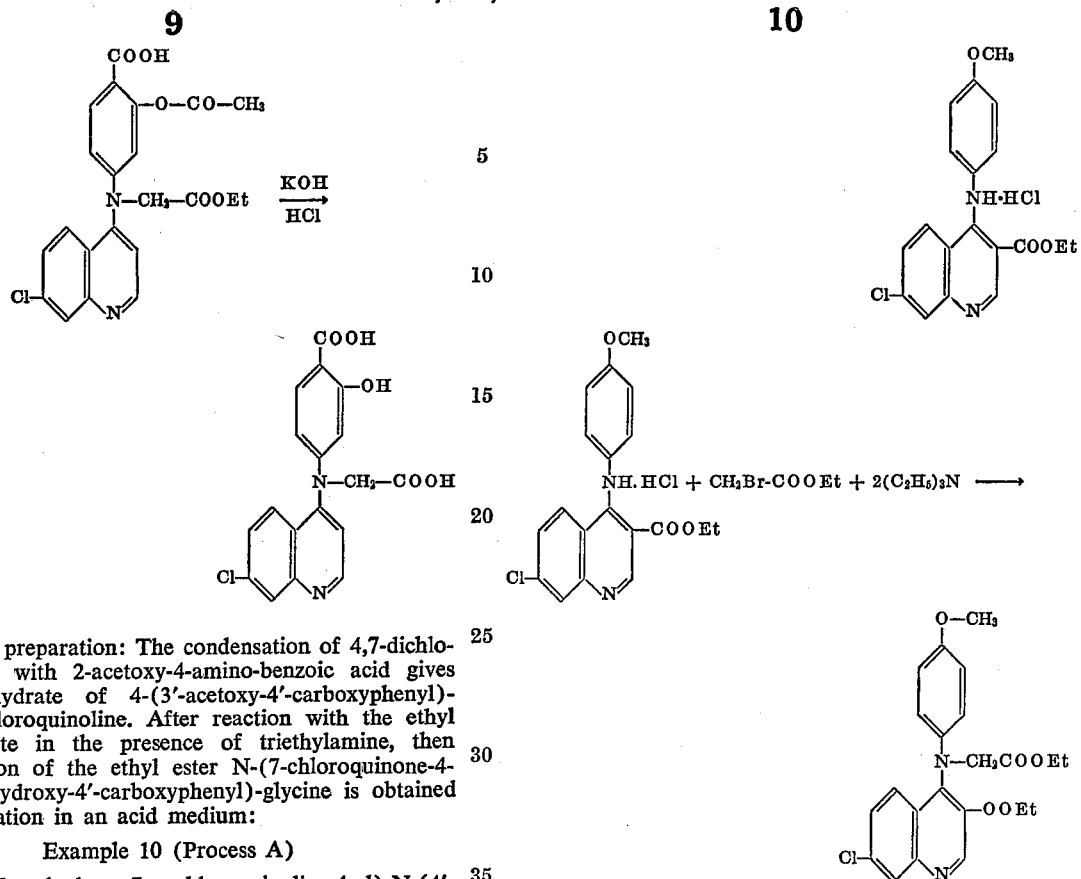

Mode of preparation: The condensation of 4,7-dichloroquinoline with 2-acetoxy-4-amino-benzoic acid gives the chlorhydrate of 4-(3'-acetoxy-4'-carboxyphenyl)-amino-7-chloroquinoline. After reaction with the ethyl bromoacetate in the presence of triethylamine, then saponification of the ethyl ester N-(7-chloroquinone-4-yl)-N-(3'-hydroxy-4'-carboxyphenyl)-glycine is obtained by precipitation in an acid medium:

Example 10 (Process A)

The N-(3-carbethoxy-7 - chloroquinoline-4-yl)-N-(4'-methoxyphenyl)-glycine ethyl ester can be obtained according to the following diagram:

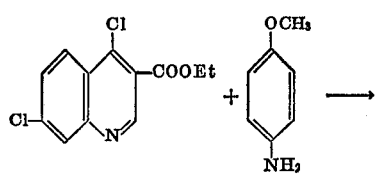

Mode of operation: The synthesis of 4,7-dichloroquinoline gives, as an intermediary stage, the 3-carbethoxy-4-hydroxy-7-chloroquinoline. By treatment with phosphoric oxychloride, the 3-carbethoxy - 4,7 - dichloroquinoline can be obtained. The continuation is produced according to the same general method.

Example 11 (Process A)

The N-alkylation of the body complying with Formula 2 can be proceded to, according to the following diagram:

$$Na_2S_2O_5 + H_2O + 2HCHO \rightarrow 2CH_2OH\text{---}SO_3Na$$

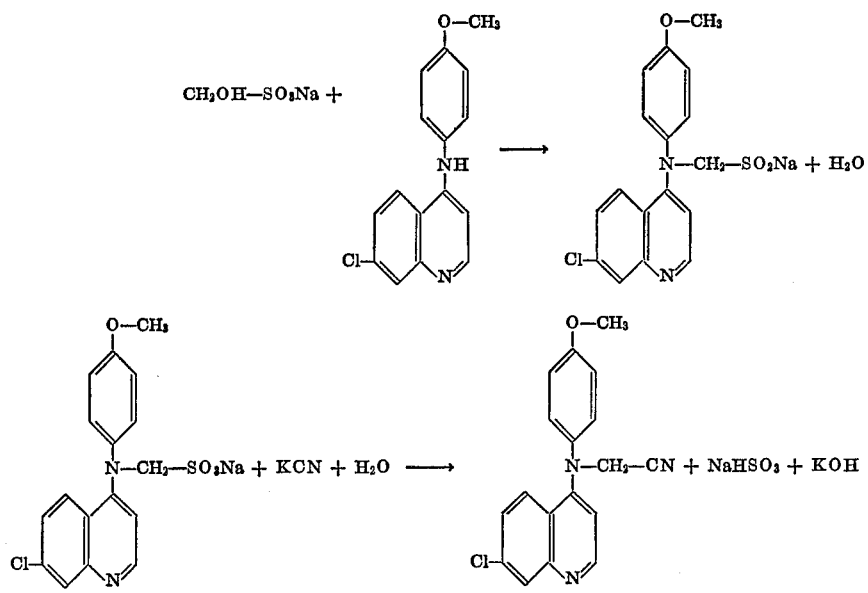

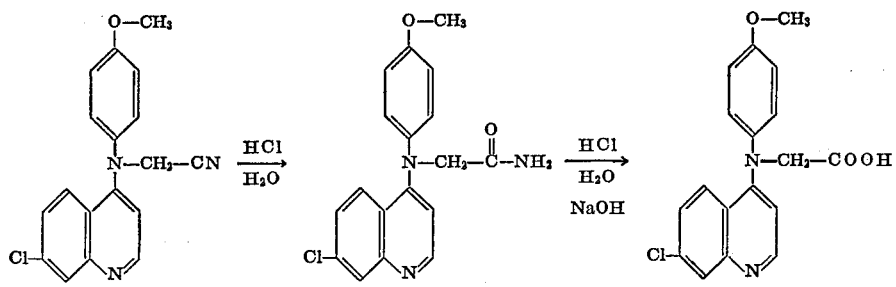 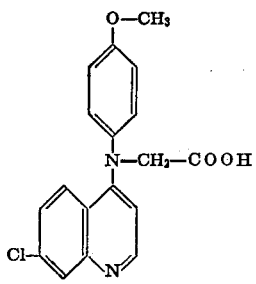

Mode of preparation:

(a) Substituted amino-acetonitril: 40 g. of soda bisulphite are dissolved in 65.3 g. of water. After cooling to 15°, 35 g. of a solution of 35% formol is slowly added under agitation. The temperature is continuously maintained at 20° to 25°. It is heated for ½ hour at 30°, then at 40° to complete the reaction. 113.5 g. of 5-(4'-methoxyphenyl)-amino-7-chloroquinoline is introduced into the reaction at this temperature. It is brought to a temperature of 75° to 80° and agitated for one hour. The sodium salt of the sulphonic methylene amino acid partially crystallizes in the reaction. A solution of 26 g. of potassium cyanide in 50 ml. of water is prepared, which is introduced into the reaciton at 75° under strong agitation. The precipitate rapidly changes appearance; it is agitated for another hour then the N-(4'-methoxyphenyl)-N-(7-chloroquinoline-4-yl)-amino-acetonitrile is left to crystallize.

(b) Substituted glycine amide: Next, 65 g. of N-(4'-methoxyphenyl) - N-(7 - chloroquinoline - 4-yl)-amino-acetonitrile are treated for one hour at 70° to 75° with 300 ml. of 30% concentrated hydrochloric acid under agitation. After cooling chlorhydrate of the N-(4'-methoxyphenyl)-N-(7-chloroquinoline - 4 - yl)-glycine amide is crystallized.

(c) N-(7-chloroquinoline-4-yl) - N-(4'-methoxyphenyl)-glycine: Finally the previous amide is brought to reflux for ½ hour in 500 ml. of 5% caustic potash added to 100 ml. of ethyl acohol. After filtering the warm solution it is neutralized to pH 5 with concentrated hydrochloric acid and the N-(7-chloroquinoline-4-yl)-N-(4'-methoxyphenyl)-glycine is left to precipitate.

Example 12 (Process A)

It is also possible to proceed to the N-alkylation of the body complying to the Formula 2 by reaction with the ethyl diazoacetate according to the following diagram:

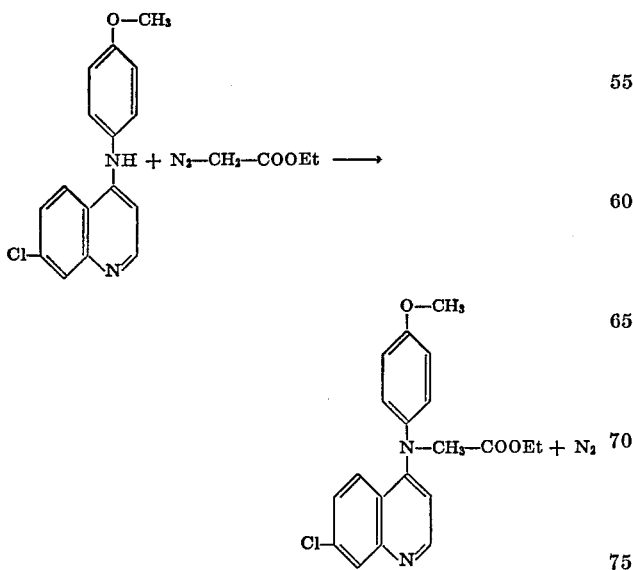

Mode of operation: 28.5 g. of 4-(4'-methoxyphenyl)-amino-7-chloroquinoline are heated to 120–130° with 100 ml. of diazoacetate freshly prepared up to the end of the release of the nitrogen. The rest of the ester is then cooled and next distilled in a dry vacuum. The raw N-(7-chloroquinoline-4-yl)-N-(4' - methoxyphenyl)-glycine ethyl ester is obtained which is saponified in 5% alcoholic potash as previously indicated.

Example 13 (Process B)

Reaction of the substiuted N-arylglycines on the 4-chloroquinolines. The conveniently substituted 4-haloquinolines being of easy access, this method is convenient for the fixing of the substituents $R_6$ and $R_7$ in positions 5–8 on the quinoline nucleus.

The reaction is brought about according to the following diagram:

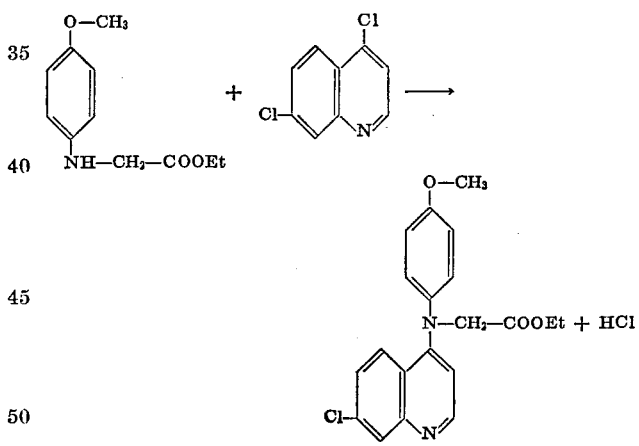

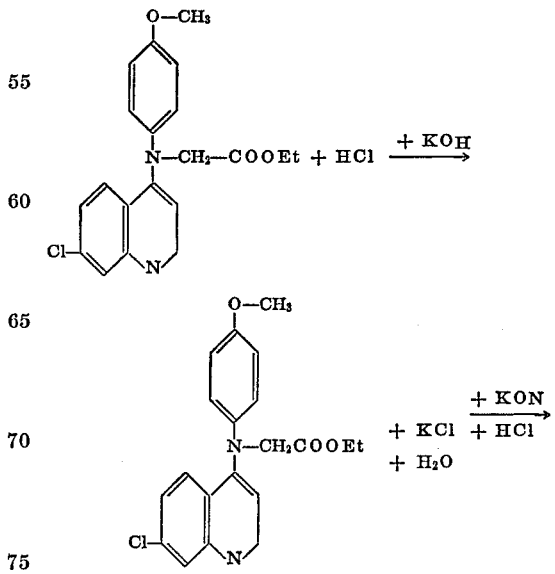

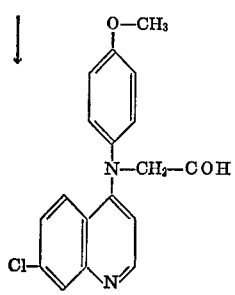

Modes of operation:

(a) In acid medium (diluted HCl): 50 g. of 4,7-dichloroquinoline is diluted in a mixture of 400 g. of water and 100 g. of 25% concentrated hydrochloric acid at 50°. At the same temperature, a solution of 52.3 g. of N-(p-methoxyphenyl)-glycine ethyl ester is added to a mixture of 300 g. of water and 46 g. of 25% concentrated hydrochloric acid.

It is agitated for 3 hours at 60°, then 4 hours at 95°. The chlorhydrate of the ester is next saponified to reflux in a mixture 750 ml. of 4% caustic potash and 100 ml. of ethanol. After filtration it is acidified to pH 5 with concentrated hydrochloric acid. Thus 64 g. of N-(7-chloroquinoline-4-yl)-N-(4'-methoxyphenyl) - glycine, F=218–220°, is made to precipitate.

(b) By fusion in phenol: A mixture of 50 g. of 4,7-dichloroquinoline, 52.3 g. of N-(p-methoxyphenyl)-glycine ester and 250 g. of phenol are heated 10 hours at 125°. After cooling the volume, the phenol is distilled wtih water vapour. The oily residue is saponified in 750 ml. of 4% potash containing 100 ml. of ethanol for ½ hour. It is treated with carbon and filtered clear. The filtrate is acidified to pH 5 and 30 g. of N-(7-chloroquinoline 4-yl)-N-(4'-methoxyphenyl)-glycine, F=218–220°, is left to crystallize.

(c) In an alkaline medium: (1) 52.3 g. of N-(p-methoxyphenyl) glycine ethyl ester is dissolved in 500 ml. of anhydrous toluene. It is brought to reflux then over ½ hour. 11 g. portions of pulverized sodium amide are slowly added. The soda derivative quickly precipitates in the solution. After distillation of 200 ml. of toluene in order to eliminate the rest of the ammonia, a warm and filtered solution of 50 g. of 4,7-dichloroquinoline in 200 ml. of toluene is added to the reaction. This is continued to reflux for another two hours. After filtration of the sodium chloride the solvent is distilled in a vacuum. The residue is taken up again in a mixture of 400 g. of 4% caustic potash and 100 ml. of ethanol, then saponified to reflux for ½ hour. It is treated with carbon and filtered. The alkaline solution is acidified to pH 5 and 45 g. of N-(7-chloroquinoline - 4 - yl)-N-(4'-methoxyphenyl)-glycine, F=218–220°, is left to crystallize; (2) A mixture of 50 g. of 4,7-dichloroquinoline 52.3 of N-(p-methoxyphenyl glycine ethyl ester, 30 g. of triethylamine and 300 ml. of neat toluene is brought to reflux for six hours. After cooling, the mixture of chlorhydrate of triethylamine and N-(7 - chloroquinoline-4-yl)-N-(4'-methoxyphenyl glycine ethyl ester is filtered and then dried in a vacuum.

This mixture is diluted in 500 ml. of cold water; then filtered. The precipitate is saponified in 400 ml. of 4% caustic potash and 50 ml. of ethanol to reflux for ½ hour. It is treated with carbon and filtered. The alkaline solution is then neutralized to pH 5. 60 g. of N-(7-chloroquinoline-4-yl)-N-(4'-methoxyphenyl)-glycine is filtered. F=218–220°.

Example 14 (Process C)

Preparation of the ethyl ester from N-(3,4-diaminophenyl)-glycine. One N-(7-chloroquinoline-4-yl)-glycine ethyl ester is made to react on the dinitrobromobenzene, with a subsequent reduction of the dinitrated derivative obtained on the Pd/carbon catalyst, according to the following diagram:

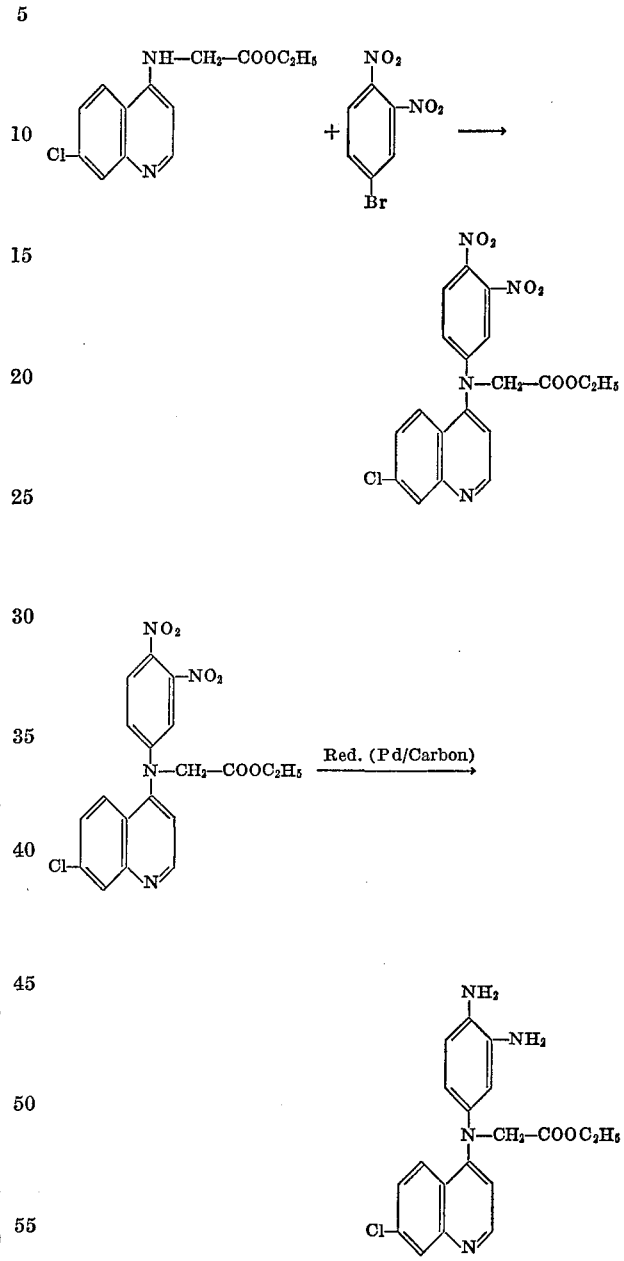

Mode of operation: The condensation of 1,2-dinitro-4-bromo-benzene with the N-(7-chloroquinoline-4-yl)-glycine ethyl ester in the amylic alcohol to reflux in the presence copper powder gives N-(7-chloroquinoline-4-yl)-N-(3',4'-dinitrophenyl)-glycine ethyl ester.

After catalytic reduction by means of palladium on carbon or Raney nickel in alcohol, the N-(7-chloroquinoline-4-yl)-N-(3',4'-diaminophenyl)-glycine ethyl ester is obtained.

It is then possible by treatment with sodium nitrite in diluted hydrochloric acid, to obtain the diazonium salt which decomposes by simple heating. The N-(7-chloroquinoline-4-yl)-N-(3',4'-dihydroxyphenyl) - glycine ethyl ester is saponified in 10% alcoholic potash then precipitated in an acid medium.

Example 15 (Process C)

Preparation of N - (7-chloroquinoline-4-yl)-N-(4'-methoxyphenyl)-glycine: The reaction is made according to the following diagram:

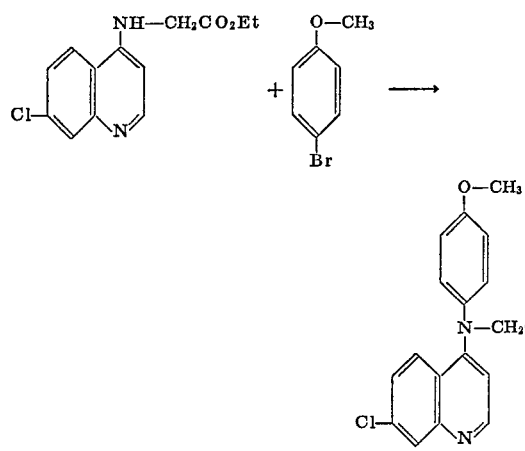

Mode of operation: 26.5 g. of N-(7-chloroquinoline-4-yl)-glycine ethyl ester is brought to reflux for 6 hours with 18.7 g. of bromoanisole in 500 ml. of amylic alcohol in the presence of 1 g. of copper powder. Warm filtered, the bromohyrate of N - (7-chloroquinoline-4-yl)-N-(4'-methoxyphenyl)-glycine ethyl ester is then left to crystallize. The product is saponified in 300 ml. of 4% caustic potash in water with the addition of 100 ml. of ethanol. After filtration and acidification with 25% concentrated hydrochloric acid, 28 g. of N-(7-chloroquinoline-4-yl)-N-(4'-methoxyphenyl)-glycine is recovered. F=218–220°.

Example 16 (Process C)

Preparation of the N - (7-chloroquinoline-4-yl)-N-(3'-acetoxy - 4' - carboxyphenyl)-glycine: The reaction is brought about according to the following diagram:

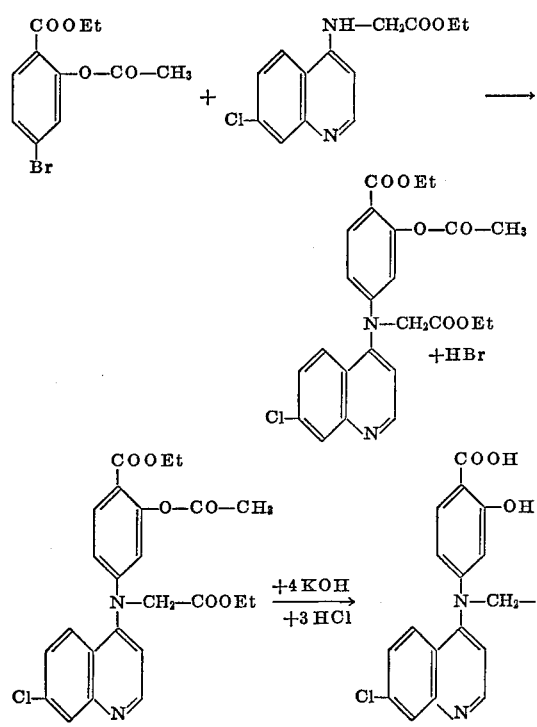

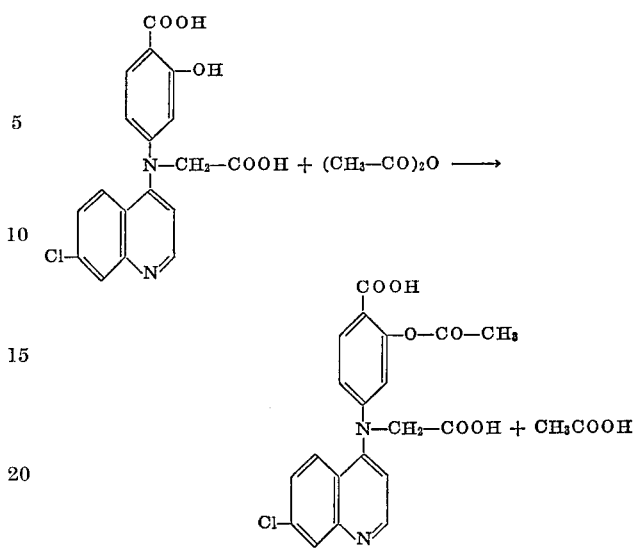

Mode of operation: A mixture of 26.5 g. of N-(7-chloroquinoline-4-yl)-glycine ethyl ester with 28.7 g. of 2-acetoxy-4'-bromo-ethyl-benzoate is heated to reflux for 10 hours in 500 ml. of amylic alcohol in the presence of 2 g. of copper powder. Still warm, the reaction is filtered; then the bromhydrate of N-(7-chloroquinoline-4-yl)-N-(3'-acetoxy-4'-carbethoxyphenyl)glycine ethyl ester is left to crystallize. This product is saponified to reflux for ½ hour in 600 ml. of a 4% caustic potash aqueous solution with the addition of 100 ml. of ethanol. The alkaline solution is filtered, then acidified with 25% concentrated hydrochloric acid. Thus 32 g. of N-(7-chloroquinoline-4-yl)-N-(3'-hydroxy-4'-carboxyphenyl)-glycine is obtained. This product is dissolved in 250 ml. of icy acetic acid at 60, then treated with 20 g. of acetic anhydride. It is brought to reflux for ½ hour, then filtered. The solution is concentrated in a dry vacuum, the residue is recrystallized in absolute alcohol. In this way 30 g. of N-(7-chloroquinoline - 4-yl)-N-(3'-acetoxy-4'-carboxyphenyl)glycine is recovered.

Example 17 (Process D)

The compounds according to the invention can also be obtained by the reaction of N-arylglycine substituted with a di-acid capable of being fixed onto the nitrogen of the glycine, then by the action of an orthoformate and of an aniline to give an acrylamide which is cycled under the action of polyphosphoric acid according to the following diagram:

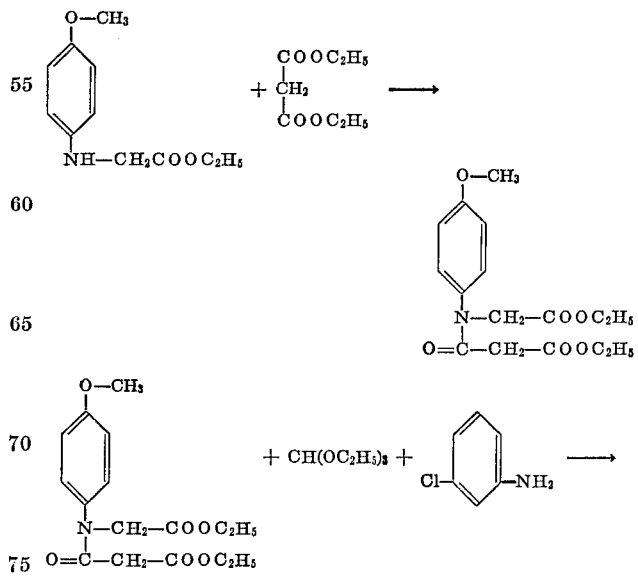

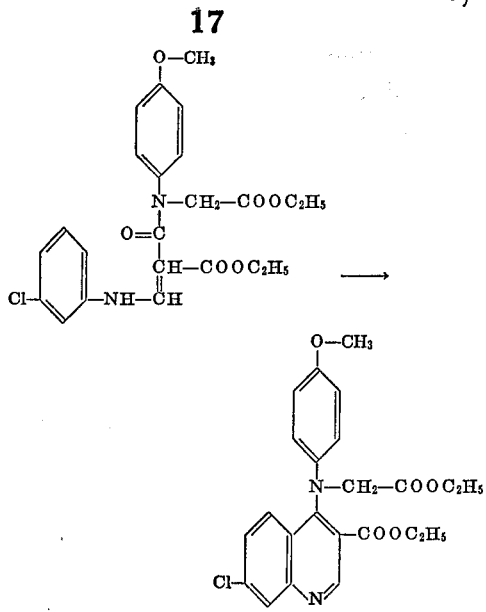

Mode of operation: The N-(4-methoxyphenyl)-glycine ethyl ester reacts with the malonate of ethyl to reflux to give the N - (carbethoxymethyl)-N-(4'-methoxyphenyl) malonate of ethyl mono amide. By subsequent reaction with the orthoformiate of ethyl and the 3-chloroaniline the α - carbethoxy - β-(3-chloroaniline)-N-(4'-methoxyphenyl) - N - carbethoxymethyl)-acrylamide is obtained is cycled in N - (3-carbethoxy-7-chloroquinoline-4-yl)-N- which is cycled in N-(3-glycine ethyl ester by heating to 250° or in the presence of polyphosphoric acid.

The application of this method allows, among others, to obtain derivatives having a carbethoxy group in portion 3 on the quinoline nucleus ($R_5=COOC_2H_5$).

Relating to the present invention, the following compounds have been prepared:

3000 N-(7-chloroquinoline-4-yl)-N-(4'-methoxy-
3001   phenyl)-glycine methyl ester
3002 ethyl ester
3003 amide
3004 amino ethanol amide
3005 morpholide
3006 dimethylamino ethanol ester
3007 glycerine ester
3008 β-propionic derivative
3009 α-propionic derivative
3010 glycolic derivative
3011 malonic derivative
3012 α-amino acetic derivative
3013 4'-hydroxyphenyl
3014 3',4'-dihydroxyphenyl
3015 3',5'-dimethoxyphenyl
3016 4'-chlorophenyl ethyl ester
3017 β-propionic 4'-ethoxyphenyl
3018 salicylyl derivative
3019 3-carbethoxy ethyl ester
3020 6,7-dichloro-methyl-ester derivative
3021 6-amino-7-chloro-methyl-ester
3022 salicylyl glycerine ester
3023 6-methoxy-7-chloro-dimethylamino ethanol ester
3024 3',4'-dimethoxy-methylamide
3025 6,7-dichloro-malonic ethyl ester
3026 3',4'-dihydroxy-α-propionyl benzyl ester
3027 2'-methyl-4'-methoxy-glycolate of butyl
3028 6,7-dichloro-α-succinic
3029 3,7-dichloro-ethyl ester
3030 3-cyano-acetamide
3031 3-carboxymido salicyl acetamide
3032 salicyl morpholide
3033 4'-hydroxymethyl-oxy-α-propionyl-dimethylamino ethanol ester
3034 acetyl-salicylyl methyl ester
3035 anthranylyl-dimethyl-amino ethanol ester
3036 propionic m-toluidino
3037 β-phenyl-propionyl-dimethylamino ethanol ester The N - (7-chloroquinoline-4-yl)-N-(4'-methoxyphenyl)-glycine (MG 3000) has been chosen as representative of these derivatives for the preliminary clinical tests.

CHARACTERISTICS (1) Toxicity

Acute toxicity in bone of MG 3000 is the following:

DMT mice: 4.100 mg./kg.
DMT rats: 5 g./kg.

Doses of 100 and 250 mg./kg. of MG 3000 were administered orally to rats over one month without alteration of the scanned norms.

(2) Analytic

The purity of the product is determined by potentiometric measurement by means of a solution of 0.1 N perchloric acid in the dioxane in a solution of anhydride acetic acid.

(3) Posology

10–12 mg./kg. orally
5–8 mg./kg. by injection (4) Pharmacological properties

| Number of animals | Stock | Weight, g. | Dose | Increase in volume of feet | | Percent of inflammation prevention |
|---|---|---|---|---|---|---|
| | | | | Rats treated | Control rats | |
| (a) Plantar oedema (rats): | | | | | | |
| (1) Formol: 10–10 | Sherman | 385–330 | 170 mg./kg. per bone | 14.7 | 30.5 | 51.88 |
| (2) Carrageenine: 9–10 | Sherman | 430–465 | 170 mg./kg. | 13.4 | 18.5 | 38.8 |
| (3) Crotonal oil: | | | | | | |
| 10–10 | Wistar | 215–240 | 170 mg./kg. | 14.3 | 23.4 | 38.8 |
| 10–9 | Sherman | 300–245 | 170 mg./kg. | 16.5 | 20.7 | 20.3 |
| | | | | Relation between the weight of the conjunctive and the initial weight of the pellet | | |
| (b) Pellets (rats): 8–10 | Sherman | 355–410 | 100 mg./kg./d. for 10 d | 4.8 | 5.3 | 9.4 |
| (c) Antipyretic activity: Slight activity | | | | | | |
| | | | | Threshold of reaction to pain, volts | | |
| (d) Analgesic activity: 5, 4 | Sherman | 210–215 | 400 mg./kg. 30 min. before | 40 | 30 | |

(5) Clinical tests

In consideration of the pharmacological observations, the clinical tests have been carried out on the first series of various cases intended also to prove the antalgic effect of the product as well as its anti-inflammatory effectiveness over a total of 50 cases.

Indications: The following indications give the reason for the choice of the clinical cases: coxarthrosis, spondylarthrosis, gonarthrosis, periarthritis, scapulohumeral, chronic evolutive polyarthritis.

Posology: The preferred posology adopted was 4, 6 and up to 8 pills of 100 mg. of active substance per day, generally administered by three at meal-times, according to the case under study. This amounted to a dosage range of from 400 to 800 mgm. of active substance for patients of normal weight. Variations in dosage up to twice the preferred range may be used. During treatment patients received no other medicine.

Control: During the study each patient was observed according to the criteria of the disappearance of pains and the state of the articular mobility. Parallel with these analyses allowed the possible evolution of the blood formula: White corpuscles, hemoglobin, plaquettes and certain enzymes, alkaline phosphates and transaminases SGOT and SGPT.

Duration: The treatment varied from 7 to 27 days according to the case and the results obtained.

Observations: It must be directly noted that significant biological alterations were not observed in any of the treated patients. At the same time the absence of secondary effects must be stressed, such as drowsiness, migraine, allergies, nausea, vomiting or gastric burns, for example, except in the case when vomiting stopped when the medicine stopped however in a patient with a strong psychic constitution.

The antalgic effect notably appears in general as early as the second day of treatment and the anti-inflammations effect manifests itself a little later, from the third or fourth day in certain cases and from the fourth or fifth in others.

The best results were obtained in truly chronic disorders: coxarthrosis and polyarthrosis. On the other hand, cases of chronic evolutive polyarthritis have reacted less well to this medicament, as far as the doses used and the time of treatment were concerned, and it was necessary to resort to corticosteroides, for example.

| Results | Very good | Good | Bad |
| --- | --- | --- | --- |
| 8. Coxarthrosis | 5 | 2 | 1 |
| 9. Gonarthrosis | 6 | 3 |  |
| 4. Spondylarthrosis | 2 | 1 | 1 |
| 8. Polyarthrosis | 2 | 3 | 3 |
| 8. Radicular syndrome | 3 | 3 | 3 |
| 4. Scapulo humeral periarthritis |  | 1 | 3 |
| 6. Lombalgies | 4 | 2 |  |
| 3. Chronic evolutive polyarthritis |  | 1 | 2 |
| 50 | 22 | 16 | 13 |

The results thus obtained seem interesting as much for long term treatments, taking into account the absence of established secondary effects. It will be understood that that compounds in question can be administered in the form of powders, pills, dragees, capsules, cachets, solutions for injections, suspensions, syrups, suppositories, or all other pharmaceutical forms. By way of example, the excipients indicated hereafter are the excipients necessary for making pharmaceutical forms and each with the concentration of the active constituent, generally 100 mg.

For a pill:                                                     Mg.
    Active ingredient _____ 100
    Milk sugar _____ 90
    Polyvinylpyrrolidone _____ 2
    Silicic acid _____ 1
    Cornstarch _____ 46
    Stearate of magnesium _____ 1
    Talc _____ 10

Total for a pill _____ 250

For a solution intended for i.m. injection:            Mg.
    Active ingredient _____ 100
    Sodium chloride _____ 2.5
    Binder, distilled water q.s. ad. _____ 1

Although no counter-indications nor secondary effects are known for these compounds, their posology can only be determined by a doctor and by individual dose which should be adapted to the patient's reactivity, the severity of the symptoms, age and weight of the patient and the general physical condition of the patient.

The compounds may be administered alone, merely being incorporated into a suitable vehicle but they may also be combined with other medicinal ingredients in compositions directed to the same or other symptoms of the syndrome under treatment. These compositions may include other analgesics such as aspirin or morphine or where indicated anticholinergic, costicosteroid or uricosuric agents.

What I claim and desire to secure by Letters Patent is:

1. A pharmaceutical composition for alleviating inflammation and pain in a mammal comprising in dosage unit form a pharmaceutical non-toxic effective dose containing at least 100 milligrams of a tertiary amino compound of the formula

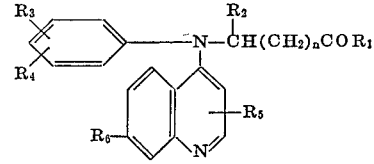

wherein:
$R_1$ is OH, $CH_3O$, $C_2H_5O$, $NH_2$, $NHCH_3$, $N(CH_3)_2$, or $NH(CH_2)_2OH$;
$R_2$ is methyl or hydrogen;
$R_3$ and $R_4$ are the same or different and are each, OH, hydrogen, lower-alkoxy, nitro, amino, methyl-amino, dimethyl-amino, acetoxy, carboxy or carbo-lower-alkoxy;
$R_5$ is hydrogen or carboethoxy;
$R_6$ is halogen and $n$ is 0 or 1 in association with a pharmaceutical carrier.

2. A pharmaceutical composition according to claim 1 in which said tertiary amine is of the formula

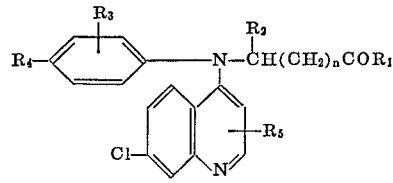

and in which $n$, $R_1$, $R_2$, $R_3$, $R_4$ and $R_5$ are as defined in claim 1.

3. A pharmaceutical composition for alleviating inflammation and pain comprising a dosage unit containing a pharmaceutical effective non-toxic amount of at least 100 milligrams of a tertiary amine of the formula

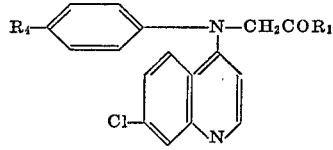

in which $R_1$ is as defined in claim 1 and $R_4$ is methoxy or ethoxy.

4. The pharmaceutical composition according to claim 3 in which said tertiary amine is N-(7-chloroquinoline-4-yl)-N-(4'-methoxyphenyl)-glycine.

5. A method of treating inflammatory and noninflammatory muscular-skeletal complaints in a mammal subject and of providing an analgetic effect which comprises administering orally to the subject a daily dose of a nontoxic pharmaceutically effective amount of at least 100 milligrams of a pharmaceutical composition defined in claim 3.

6. A pharmaceutical composition according to claim 2, in which $R_1$ is OH, $CH_3O$, or $C_2H_5O$ and $n$, $R_2$, $R_3$, $R_4$ and $R_5$ are as defined in claim 2.

7. A pharmaceutical composition as defined in claim 6, in which $R_2$ is H and $n$ is 0.

8. A pharmaceutical composition according to claim 3, in which $R_1$ is OH, $CH_3O$ or $C_2H_5O$.

9. A pharmaceutical composition as defined in claim 1, in which said composition is in the form of a dose unit form selected from the group consisting of a pill, a dragee, a capsule, an injectable solution or a suppository.

References Cited

UNITED STATES PATENTS

| | | | |
|---|---|---|---|
| 3,502,081 | 3/1970 | Allais et al. | 424—258 |
| 2,494,083 | 1/1950 | Bruce | 260—287 |
| 3,456,000 | 7/1969 | Langis | 424—258 |
| 3,406,176 | 10/1968 | Surry et al. | 260—287 |

STANLEY J. FRIEDMAN, Primary Examiner

U.S. Cl. X.R.

260—287 R; 424—248

UNITED STATES PATENT OFFICE
CERTIFICATE OF CORRECTION

Patent No. 3,769,410     Dated October 30, 1973

Inventor(s) FRANCOIS ROBERT BERTRAND

It is certified that error appears in the above-identified patent and that said Letters Patent are hereby corrected as shown below:

In the Heading of the Patent following Patentee's name and address insert:

--assignor to MEDIAL DE TOLEDO & CIE of Geneva, Switzerland.--

Signed and sealed this 16th day of April 1974.

(SEAL)
Attest:

EDWARD M. FLETCHER, JR.          C. MARSHALL DANN
Attesting Officer                Commissioner of Patents